United States Patent
Marusca et al.

(10) Patent No.: US 9,906,408 B2
(45) Date of Patent: Feb. 27, 2018

(54) NETWORK DEVICE MOUNTING RAIL FOR CONNECTING REMOVABLE MODULES

(71) Applicant: Siemens Canada Limited, Oakville, Ontario (CA)

(72) Inventors: Ioan Marusca, Ontario (CA); Kaveh Farivar Sadri, Ontario (CA); Thanh Tan Duong, Ontario (CA)

(73) Assignee: Siemens Canada Limited, Oakville, Ontario (CA)

(*) Notice: Subject to any disclaimer, the term of this patent is extended or adjusted under 35 U.S.C. 154(b) by 320 days.

(21) Appl. No.: 14/760,012

(22) PCT Filed: Dec. 5, 2013

(86) PCT No.: PCT/IB2013/060685
§ 371 (c)(1),
(2) Date: Jul. 9, 2015

(87) PCT Pub. No.: WO2014/087379
PCT Pub. Date: Jun. 12, 2014

(65) Prior Publication Data
US 2016/0197770 A1    Jul. 7, 2016

Related U.S. Application Data

(60) Provisional application No. 61/733,634, filed on Dec. 5, 2012.

(51) Int. Cl.
*H04L 12/24*    (2006.01)
*H04L 29/06*    (2006.01)
*H04L 12/413*   (2006.01)

(52) U.S. Cl.
CPC ............ *H04L 41/08* (2013.01); *H04L 12/413* (2013.01); *H04L 41/0672* (2013.01); *H04L 41/0813* (2013.01); *H04L 41/0853* (2013.01)

(58) Field of Classification Search
CPC ............. H04L 41/0813; H04L 41/0672; H04L 12/413
See application file for complete search history.

(56) References Cited

U.S. PATENT DOCUMENTS 5,825,850 A * 10/1998 Bren .................... H04M 3/28
                                                         324/543
6,449,258 B1    9/2002 Grammel
(Continued)

FOREIGN PATENT DOCUMENTS

CN    1238073 A    12/1999
CN    101772925 A    7/2010
(Continued)

OTHER PUBLICATIONS

"Series Capacitor Bypass Switch, Edition 1"—ABB, Jul. 2011 https://library.e.abb.com/public/ce122f6d0896b5b5c1257958003757dc/1HSM%209543%2022-12en%20Series%20Capacitor%20By-pass%20Switch.pdf.*
(Continued)

*Primary Examiner* — Randy Scott

(57) ABSTRACT

A network device operable to receive and forward communications over a network through at least a first network connection and a second network connection. The network device includes a bypass module having a first device network connection and a second device network connection. A controller is operative to receive control signals originating external to the network device, and to selectively switch switching elements of the bypass module between a bypass state and a connected state based on the received control signals. The first network connection and the second network connection in communication with the first device network connection and the second device network connection in the connected state. The first network connection and the second network connection in communication with each
(Continued)

other establishing a bypass communication path in the bypass state.

10 Claims, 5 Drawing Sheets

(56) References Cited

U.S. PATENT DOCUMENTS

| | | | |
|---|---|---|---|
| 7,281,141 B2 | 10/2007 | Elkayam et al. | |
| 7,310,664 B1 | 12/2007 | Merchant et al. | |
| 2005/0078700 A1 | 4/2005 | Thompson | |
| 2006/0239183 A1* | 10/2006 | Robitaille | G06F 1/266 370/217 |
| 2008/0082842 A1* | 4/2008 | Minami | G06F 1/26 713/300 |

FOREIGN PATENT DOCUMENTS

| | | |
|---|---|---|
| DE | 102010029300 A1 | 5/2011 |
| EP | 0184644 A2 | 6/1986 |
| EP | 0443583 A2 | 8/1991 |
| EP | 1515411 A1 | 3/2005 |
| EP | 1898509 A1 | 3/2008 |
| WO | 2004104805 A1 | 12/2004 |
| WO | 2009014581 A1 | 1/2009 |

OTHER PUBLICATIONS

PCT International Search Report dated Mar. 5, 2014 corresponding to PCT International Application No. PCT/IB2013/060685 dated Dec. 5, 2013 (8 pages).
European Search Report dated Jun. 24, 2016 corresponding to European Application No. 13861408.6 dated Dec. 5, 2013 (7 pages).

* cited by examiner

_US 9,906,408 B2_

NETWORK DEVICE MOUNTING RAIL FOR CONNECTING REMOVABLE MODULES

CROSS REFERENCE TO RELATED APPLICATION

This application claims priority to and all benefits accruing from U.S. Provisional Patent Application 61/733,634 filed in the United States Patent and Trademark Office on Dec. 5, 2012.

FIELD OF THE INVENTION

This invention relates to network devices for connecting to a network, such as an Ethernet network. In particular, the invention relates to network devices that connect to the network and provide network interconnection.

BACKGROUND

Network devices provide an important role in receiving and forwarding data packets on a network. Depending upon their role in the network, when in a connected state, devices may be operative to provide a network support function by receiving and forwarding data packets intended for other devices on the network.

In the event of a device failure, the network support function will no longer be operative. Depending upon the network topology employed, failure of a network device may disrupt network traffic for other still functioning devices on the network.

To overcome this limitation, network devices may be provided with a passive bypass mechanism that acts to transition from the connected state to a bypass state by physically disconnecting a failed network device from the network, and physically engaging a bypass circuit to allow network traffic to travel past the failed network device through the network.

Typically, these passive bypass mechanisms are operative to disconnect the failed network device when at least one of one or more pre-determined fault conditions affects operation of the device, such as a power failure to the device, or a fault in the device processing operations allows a bypass watchdog timer within the device to time out.

Depending upon the fault condition, it may be not be possible to re-connect the device without at least physically depowering and subsequently powering the device to initiate a system reboot. If the initial fault condition is attributable to something other than a simple loss of power to the device, it may result that the fault condition returns and the device continually triggers the bypass when the reboot is initiated. In such cases, the ability to troubleshoot the fault condition may be compromised as the device is physically disconnected from the network.

In some circumstances a particular fault or may render it expedient to enforce a bypass state on the network device, though the operational conditions of the network device do not meet the pre-determined fault conditions. Since the passive bypass mechanism only enables a bypass when the pre-determined fault condition affects operation of the device, it will not be possible to enforce the bypass state and the network device will remain physically connected to the network.

In applications where a network device may be physically difficult to reach, or is located in a physically hazardous or distant location, it would be particularly useful to be able to choose whether to engage or disengage a bypass state.

SUMMARY

In an embodiment a network device is provided. The network device operable to receive and forward communications over a network through at least a first network connection and a second network connection. The network device including a bypass module comprising: a first device network connection and a second device network connection; switching elements operable to switch between a connected state and a bypass state, wherein the first network connection is in direct communication with the first device network connection and the second network connection is in direct communication with the second device network connection in the connected state, and wherein the first network connection is in direct communication with the second network connection in the bypass state; and, a controller operative to receive control signals originating external to the network device, and to selectively switch the switching elements between the bypass state and the connected state based on the received control signals.

DETAILED DESCRIPTION

Figure 1:
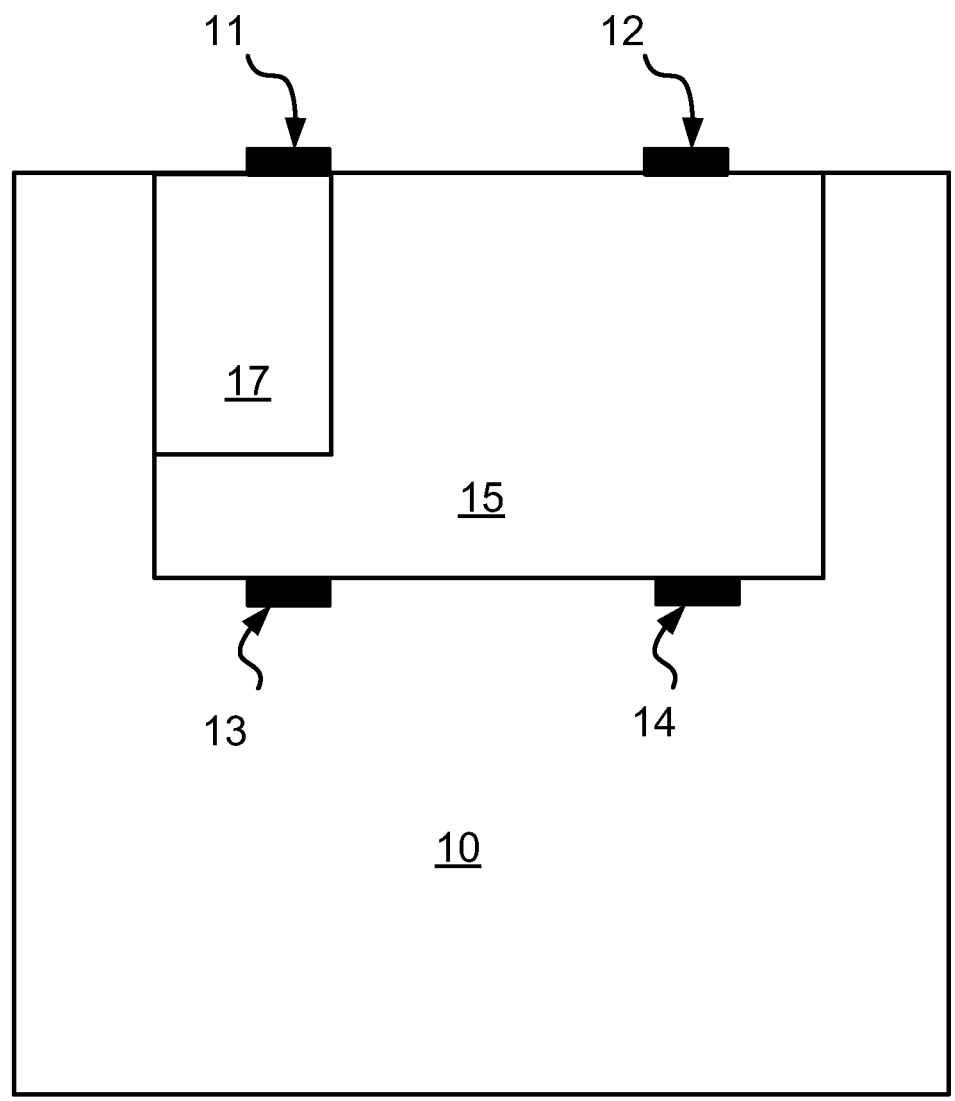
FIG. 1 is an implementation of a network device.

Referring to FIG. 1, a network device 10 is connected to a first network connection 11 and a second network connection 12. In the implementation of FIG. 1, network device 10 provides a network support function to receive and forward data packets travelling along the first network connection 11 and the second network connection 12. As will be appreciated, more than two network connections may be provided depending upon the applicable functionality of the network device 10.

A bypass module 15 is situated between the physical connection of the first network connection 11 to a first device network connection 13, and the second network connection 12 to a second device network connection 14 to enable operation in either a connected state or a bypass state.

In the connected state, the first device network connection 13 and the second device network connection 14 of the network device 10 are connected to, and in communication with, the first network connection 11 and the second network connection 12 respectively. The first network connection 11 and the second network connection 12 are disconnected in the bypass state, relying upon the network device 10 to receive and forward communications intended for transmission about the network.

In the bypass state the first device network connection 13 and the second device network connection 14 of the network device 10 are disconnected from, the first network connection 11 and the second network connection 12 respectively. The first network connection 11 and the second network connection 12 are directly connected with one another, enabling transmission of communications about the network to bypass the network device 10.

In some implementations the bypass module 15 may be further operative to provide an isolation function to electrically isolate the incoming network connections 11, 12 from the network device 10. In an implementation the bypass module 15 may be further operative to provide the isolation function when the module 15 is in either a connected state or a bypass state.

The network device 10 may be further operative to direct additional network traffic received through other communication ports to the network through the first network connection 11 and the second network connection 12. For instance, where network device 10 comprises a router, the network device 10 may be connected to one or more computing devices, and provide network connectivity to those devices as is known in the art. Since this application deals specifically with a bypass state, in which the network device 10 is disconnected from the network, further details regarding possible processing and communications forwarding operability of the network device 10 are not discussed.

Figure 2A:
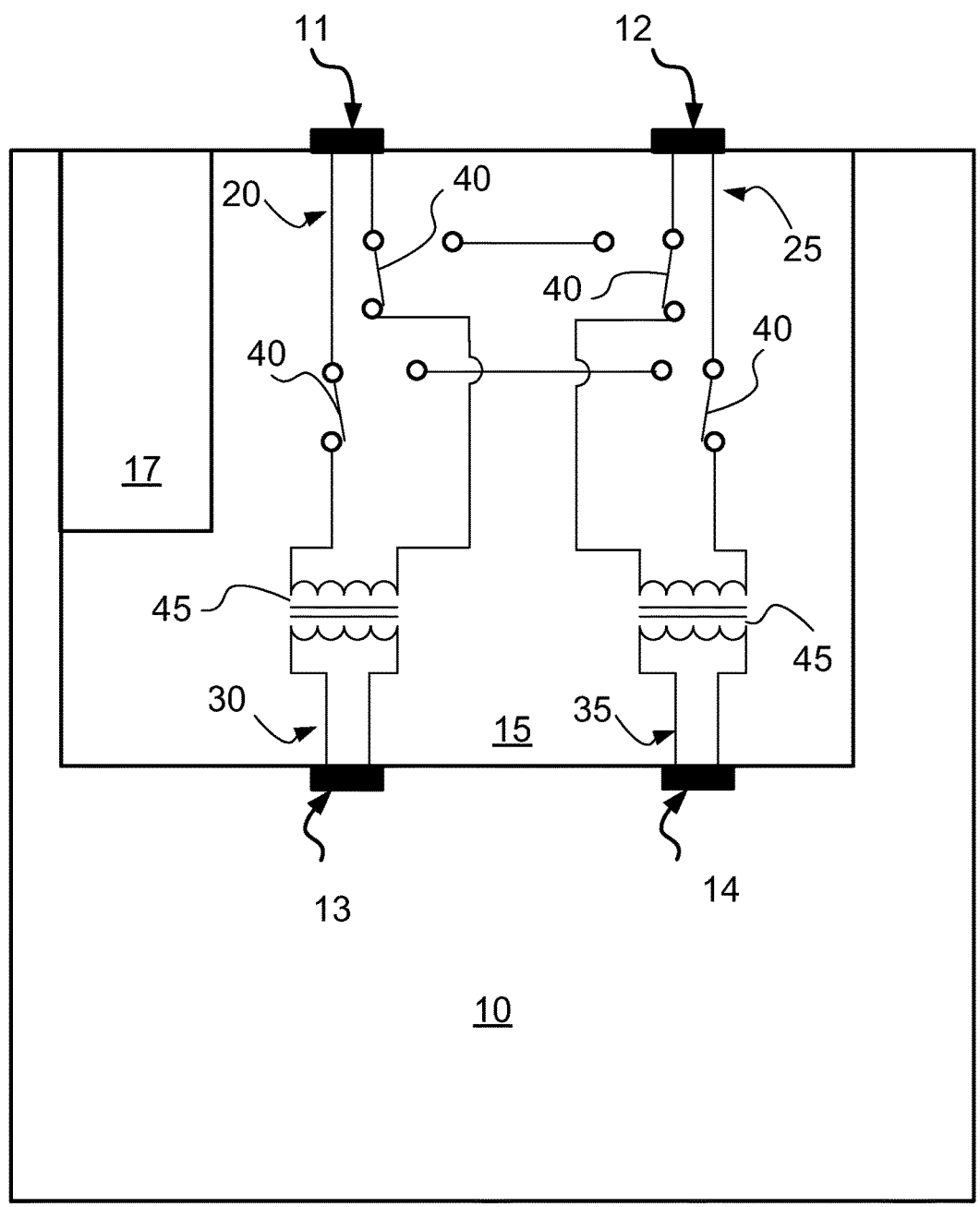
FIG. 2a illustrates an implementation of a bypass module of a network device in a connected state.

Referring to FIG. 2a, a simplified illustration of an embodiment of a bypass module 15 in a connected state is illustrated. In the implementation of FIG. 2, the first network connection 11 and the second network connection 12 may be represented by a first conductor pair 20 and a second conductor pair 25. Similarly, the first device network connection 13 and the second device network connection 14 are represented by a first device conductor pair 30 and second device conductor pair 25. The first device conductor pair 30 and second device conductor pair 25 are illustrated as being electrically isolated from the switching elements 40 by isolating elements 45, such as the isolation transformers indicated in FIG. 2. While only two conductor pairs 30, 35 are illustrated, it is intended that all conductors of the first device conductor pair 30 and the second device conductor pair 25 would similarly be isolated where an isolation element is included in the implementation of the bypass module.

As will be appreciated, typical network connections 11, 12 and device network connections 13, 14 may comprise a plurality of conductor pairs, for instance as an Ethernet connection, however it is understood that functionality described for the first conductor pair 20 and the second conductor pair 25 may be repeated for additional conductor pairs as may be applicable for different network modalities.

When using the term "network connection" in this application, the applicant is referring to each collection of conductor pairs corresponding to that network connection. Accordingly, network connection 11 and conductor pair 20 are referring to the same entity.

The bypass module 15 receives the first conductor pair 20 and the second conductor pair 25, and the first device conductor pair 30 and the second device conductor pair 35, and controller 17 is operative to selectively set switching elements 40 between a connected state and a bypass state based on received control signals originating external to the network device 10.

In an implementation the controller is powered by an independent power source from the network device 10. In an aspect, the independent power source is a hot-swappable power source. In an implementation the controller 17 is a hot-swappable power controller for controlling power to the switching elements 40 in the bypass module 15. In an aspect the switching elements 40 comprise relays.

In the connected state, the first conductor pair 20 is in operative communication with the first device conductor pair 30, and the second conductor pair 25 is in operative communication with the second device conductor pair 35. The first device conductor pair 30 is disconnected from the second conductor pair 25 in the connected state.

Figure 2B:
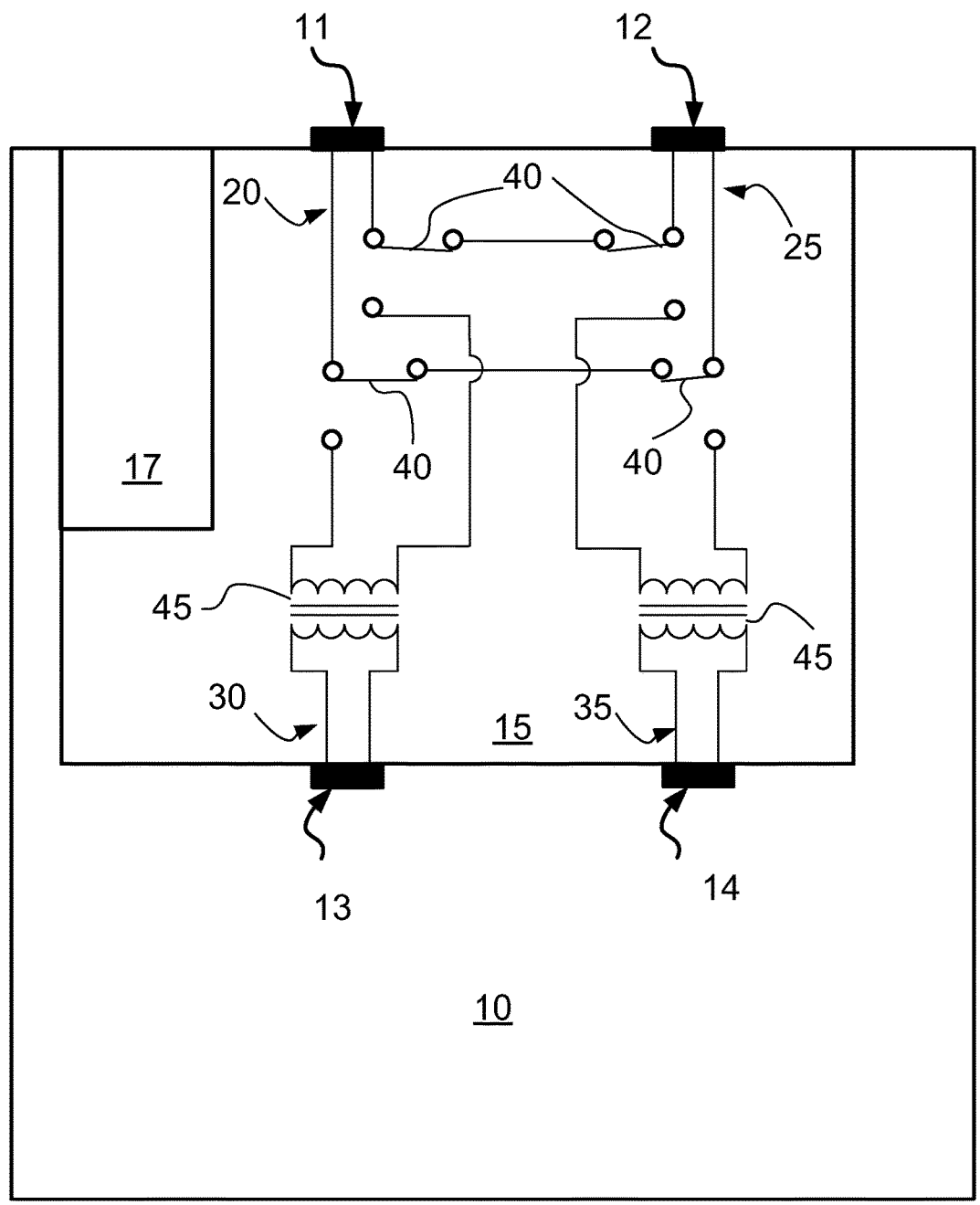
FIG. 2b illustrates an implementation of a bypass module of a network device in a bypass state.

Referring to FIG. 2b, in the bypass state a first conductor of the first conductor pair 20 is in operable communication with a corresponding first conductor of the second conductor pair 25, and a second conductor of the first conductor pair 20 is in operable communication with a corresponding second conductor of the second conductor pair 25, forming a bypass path for network traffic. In the implementation of FIG. 2b, the first device conductor pair 30 and the second device conductor pair 35 are further disconnected from the first conductor pair 20 and the second conductor pair 25 in the bypass state, such that network traffic bypasses the network device 10 through the bypass path.

In an implementation the switching elements 40 provide operable communication between the first conductor pair 20 and the second conductor pair 25 in the bypass state with a sufficiently low insertion loss that a network connection speed trough the bypass path is at or near the speed of the network connections 11, 12. In an aspect, the bypass path can sustain Gigabit Ethernet traffic and speeds.

In an implementation the controller 17 is operatively connected to at least one of the network connections 11, 12 to receive control signals communicated over the network to enable the bypass state when the bypass module 15 is in the connected state, or to lift the bypass state and return the bypass module 15 to the connected state.

In an implementation the controller 17 is operatively connected to a separate communication port to receive control signals communicated through the communication port, and not directly through either of the network connections 11, 12.

In an implementation the bypass module 15 includes both with a passive bypass mechanism and an override bypass mechanism. The passive bypass mechanism operative to switch the switching elements 40 to the bypass state from the connected state in response to a pre-determined fault condition of the network device 10. The pre-determined fault condition may comprise, for instance, a power condition of the network device 10 or an operational condition of a processing element of the network device 10. In an aspect a watchdog timer is periodically reset by the processing element. Failure to reset the watchdog timer leads to a timeout condition which comprises a pre-determined fault condition.

In an aspect, the controller is operative to provide both the passive bypass mechanism and the override bypass mechanism.

In an implementation, the controller 17 is operative to generate a state output that indicates the current state of the bypass mechanism. In an aspect, the bypass module 15 is operative to communicate the state output external to the network device 10. In an aspect, the bypass module 15 is operative to communicate the state output using the communication channel used to receive the control signals. Accordingly, in this aspect, the bypass module 15 provides feedback regarding its current bypass state. A user on the network receiving the state output can trouble shoot the network device 10, and direct the bypass module 15 to either enforce a bypass state or set a connected state based upon the current state output.

In an aspect, the passive bypass mechanism comprises circuit logic operable to switch the switching elements to the bypass state when the network device 10 is unpowered or when a fault in the device 10 processing operations allows a bypass watchdog timer within the device 10 to time out. In the aspect, the controller is independently powered and operative to override the circuit logic upon receiving an override command. The override may comprise entering the bypass state when the circuit logic is switched to the connected state, or the override may comprise entering the connected state when the circuit logic is switched to the bypass state.

Figure 3:
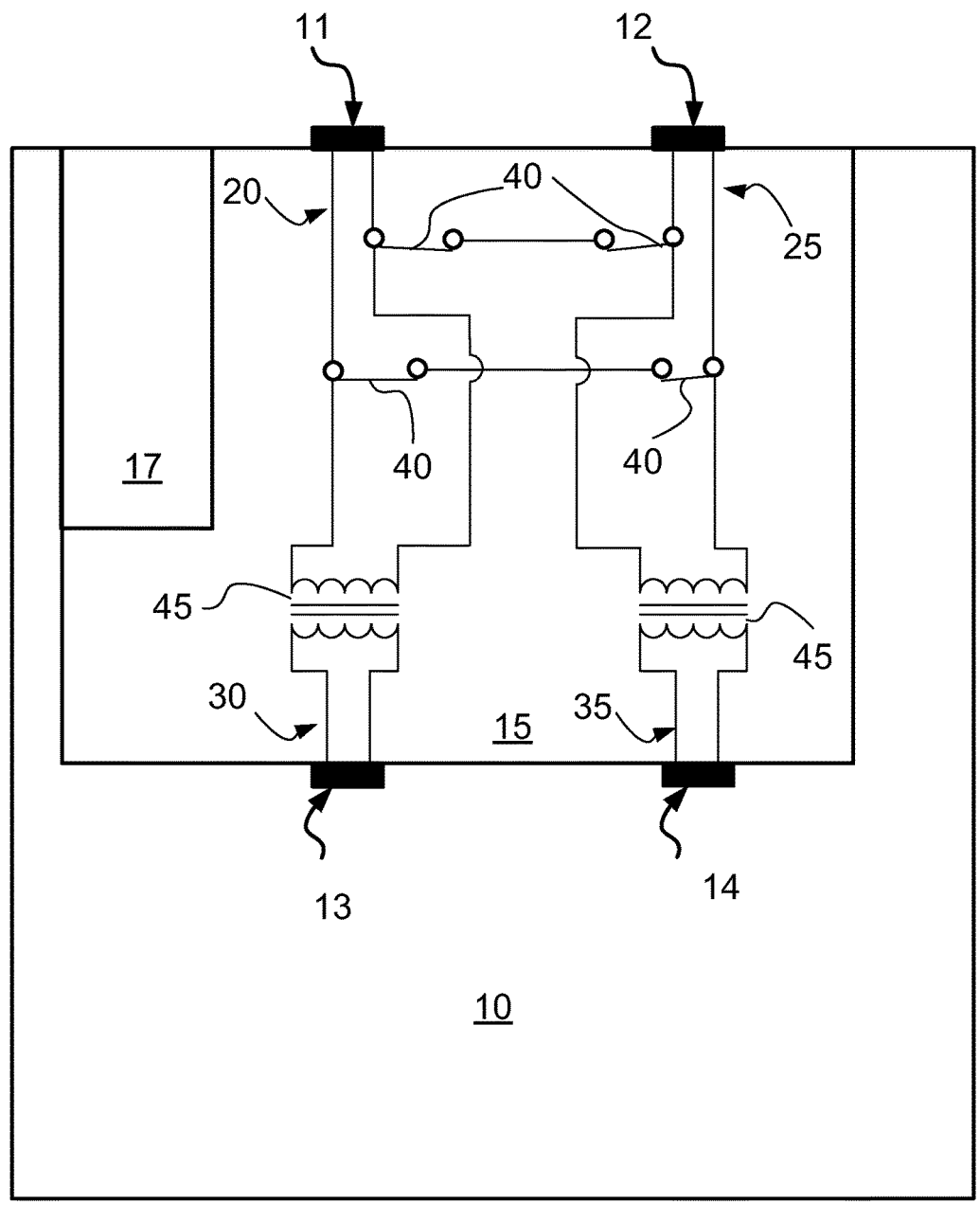
FIG. 3 illustrates an alternative implementation of a bypass module of a network device in a bypass state.

Referring to FIG. 3, in an alternate implementation shown in the bypass state, switching elements 40 connect the first conductor of the first conductor pair 20 with the corresponding first conductor of the second conductor pair 25, and the second conductor of the first conductor pair 20 with the corresponding second conductor of the second conductor pair 25, to form the bypass path, and disconnect the bypass path in the connected state, but do not further disconnect the conductor pairs from the isolation elements 45 in the bypass state.

Figure 4:
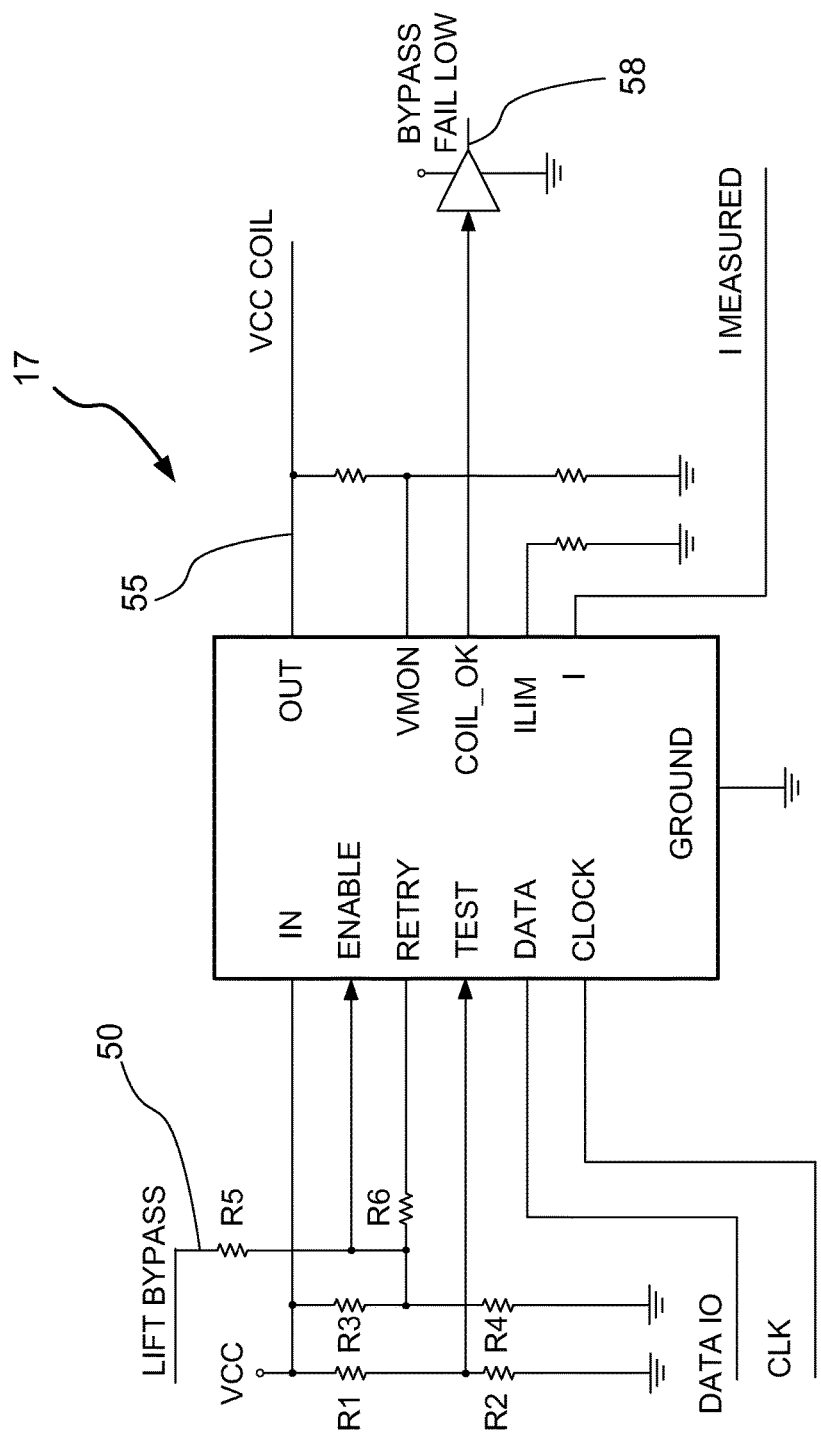
FIG. 4 illustrates an exemplary controller for a bypass module of a network device.

Referring to FIG. 4, an exemplary implementation of a controller 17 comprising a power controller, operable to receive a bypass control signal as an input 50 and to change a condition of output 50 to transition between the connected state and the bypass state is illustrated. In the implementation of FIG. 4, the controller 17 is operable to lift a bypass state based upon a control signal received through input 50. Based upon the received control signal, and depending upon the arrangement of the circuit logic, the controller 17 is operative to set a state of the output 55 to a voltage level corresponding to either the connected state or the bypass state of the switching elements 40.

For instance, where switching elements 40 are operable to switch to a bypass state on power down, a connected state control signal directing the controller 17 to lift a bypass state and engage a connected state would cause the controller 17 to force the output 55 to HIGH to switch the switching elements 40 from the bypass state to the connected state, or enforce the connected state if that was the pre-existing state at the time of receiving the connected state control signal.

Conversely, a bypass control signal directing the controller 17 to engage the bypass state would cause the controller 17 to force the output 55 to LOW to switch the switching elements 40 from the connected state to the bypass state, or enforce the bypass state if that was the pre-existing state at the time of receiving the bypass state control signal.

The implementation of the controller 17 in FIG. 4 further includes a state output 58 that provides an indication of the current state based upon whether the output 55 is in a HIGH or a LOW condition. In the arrangement illustrated in FIG. 4, state output 58 is operative to output a LOW signal when the output 55 is HIGH and the switching element 40 is in a connected state. As will be appreciated, the condition of state output 58 is by way of example and other conditions evident to a person of skill in the art are contemplated. For instance, the state output 58 could be operative to produce the opposite output from that depicted, a HIGH signal when the output 55 is high and a LOW signal when the output 55 is LOW. In the implementation, the bypass module 15 is operative to communicate state output 58 external to the network device 10.

Various embodiments of the present invention having been thus described in detail by way of example, it will be apparent to those skilled in the art that variations and modifications can be made without departing from the invention. The invention includes all such variations and modifications as fall within the scope of the appended claims.

We claim:

1. A network device operable to receive and forward communications over a network through at least a first network connection and a second network connection, comprising:
    a bypass module comprising:
        a first device network connection and a second device network connection;
        switching elements operable to switch between a connected state and a bypass state, wherein the first network connection is in direct communication with the first device network connection and the second network connection is in direct communication with the second device network connection in the connected state, and wherein the first network connection is in direct communication with the second network connection in the bypass state; and,
        a controller operative to receive control signals originating external to the network device, and to selectively switch the switching elements between the bypass state and the connected state based on the received control signals,
    wherein the controller is further operative to generate a state output of the switching elements that indicates whether the bypass module is in a connected state or a bypass state, and
    wherein the bypass module is operative to communicate the state output external to the network device.

2. The network device of claim 1 further comprising isolating elements for electrically isolating the first device network connection and the second device network connection from the switching elements.

3. The network device of claim 1 wherein the controller is operative to receive the control signals as communications received over at least one of the first network connection and the second network connection.

4. The network device of claim 1 wherein the controller is operative to receive the control signals through a communication port separate from the first network connection and the second network connection.

5. The network device of claim 1 further comprising a bypass module power source independent from a power source of the network device, the bypass module power source for supplying power to at least the controller and the switching elements.

6. The network device of claim 5 wherein the bypass module power source comprises a hot-swappable power source.

7. The network device of claim 1 wherein the wherein the first device network connection and the second device network connection are disconnected by the switching elements in the bypass state.

8. The network device of claim 1 wherein the switching elements comprise relays.

9. The network device of claim 1 further comprising:
    a passive bypass mechanism operable to switch the switching elements from the connected state to the bypass state in response to at least one pre-determined fault condition of the network device;
    wherein the controller is operative to provide an override bypass mechanism that overrides the passive bypass mechanism based upon the received control signals.

10. The network device of claim 9 wherein the controller is operative to provide both the passive bypass mechanism and the override bypass mechanism.

* * * * *